April 20, 1937.   G. P. VINCENT   2,078,045
PROCESS FOR THE PRODUCTION OF CHLORINE DIOXIDE
Filed June 17, 1936   3 Sheets-Sheet 1
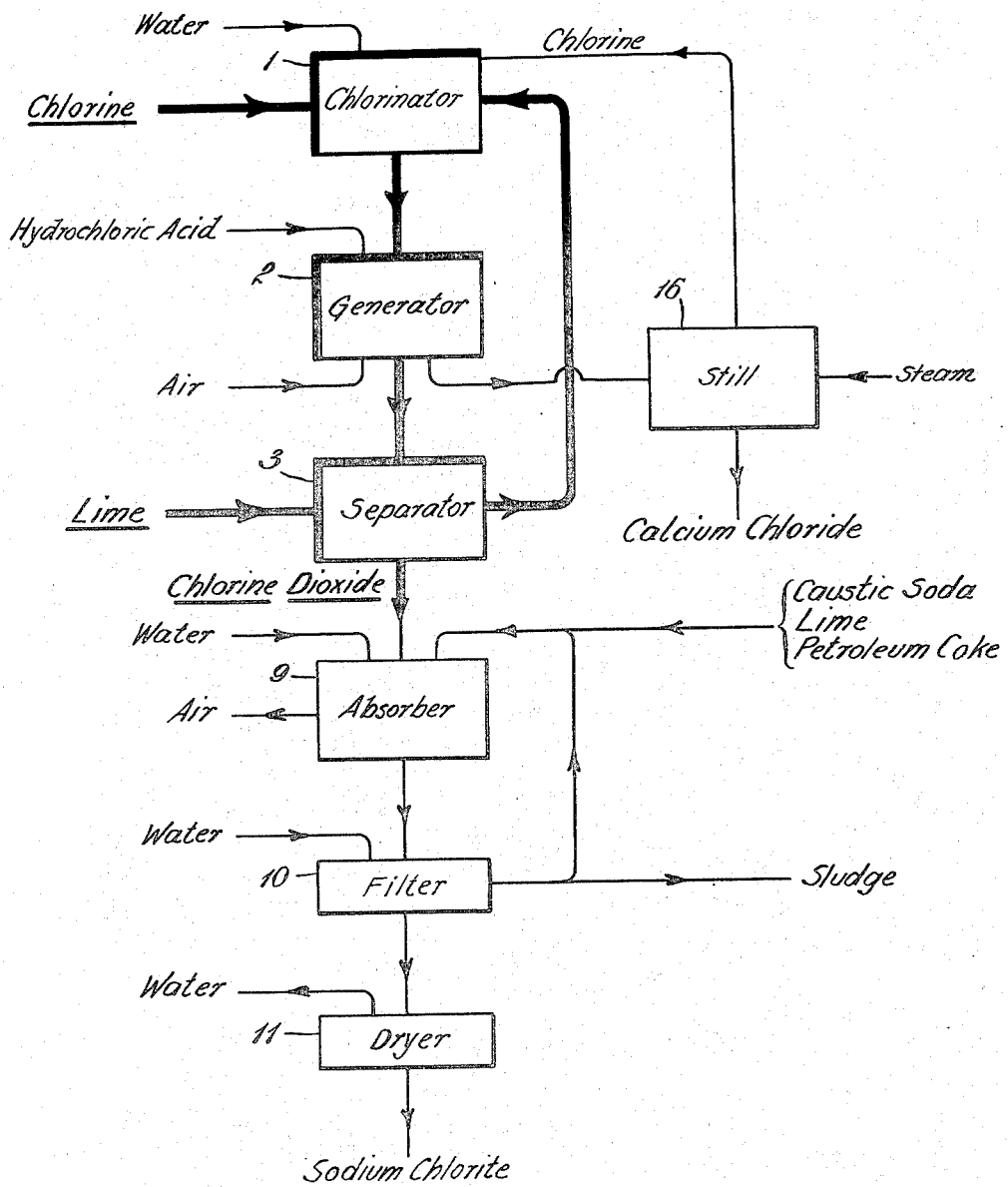
INVENTOR
George P. Vincent
BY
ATTORNEY

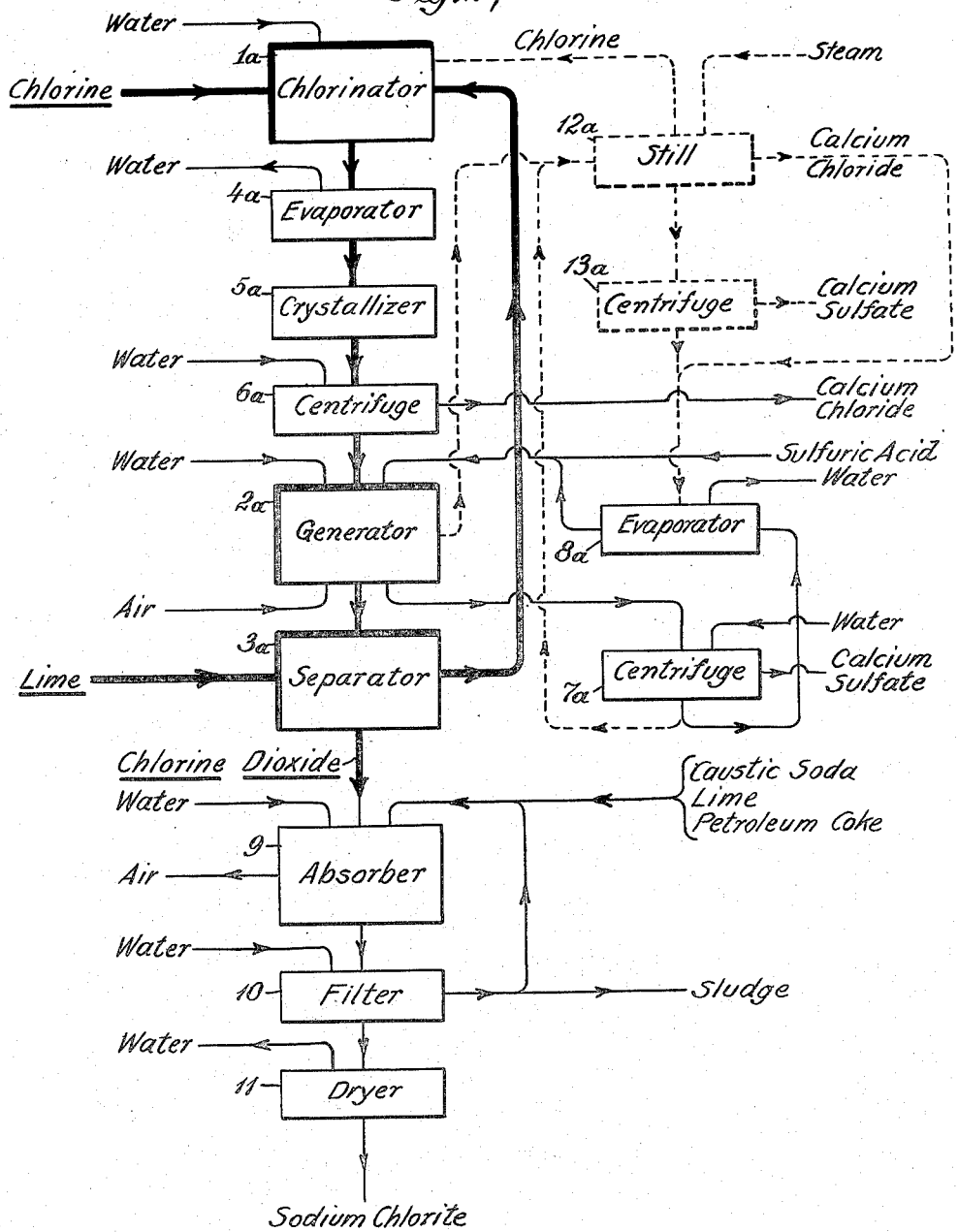

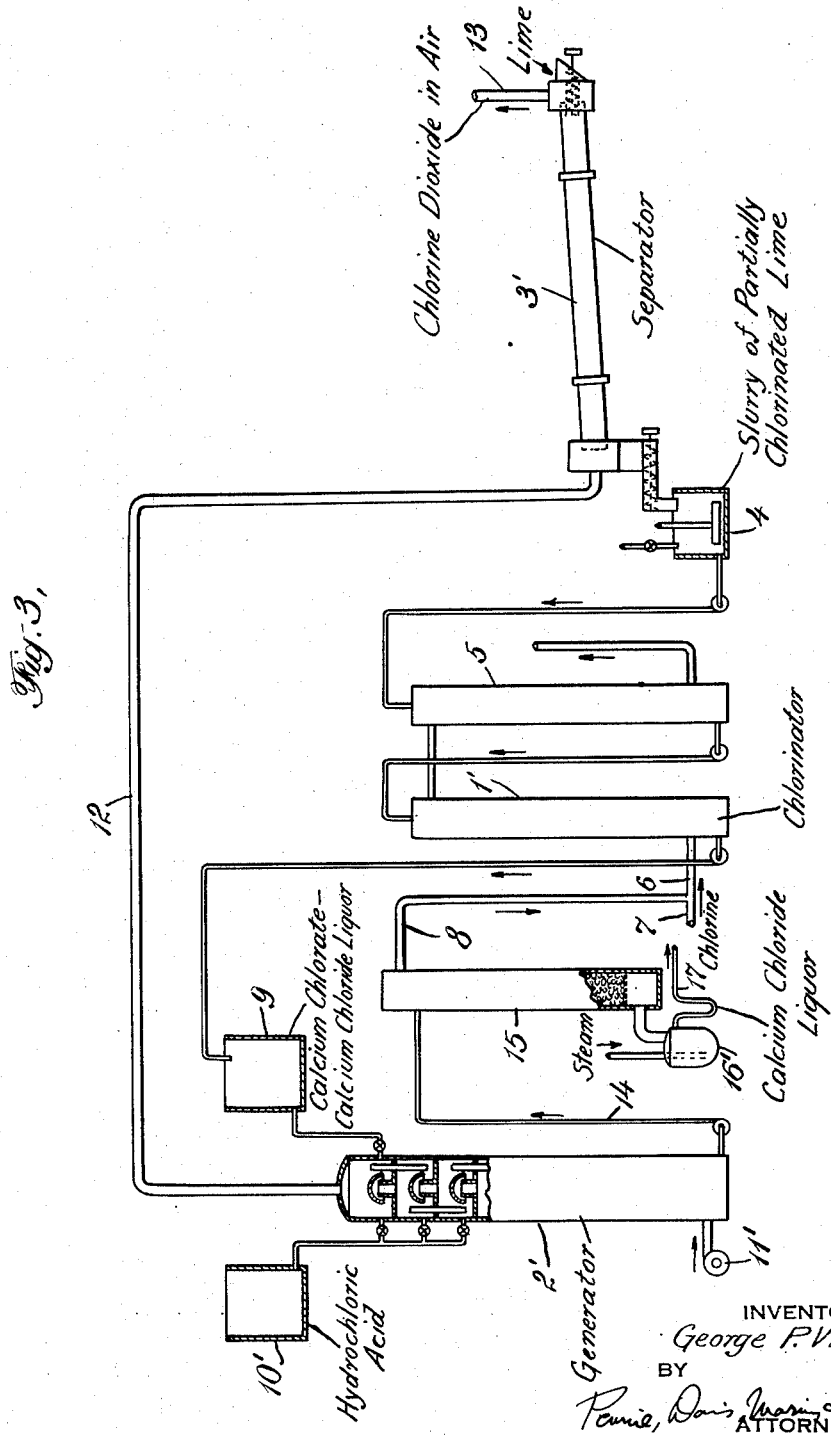

Patented Apr. 20, 1937

2,078,045

UNITED STATES PATENT OFFICE 2,078,045

PROCESS FOR THE PRODUCTION OF CHLORINE DIOXIDE

George Paul Vincent, New York, N. Y., assignor to The Mathieson Alkali Works, Inc., New York, N. Y., a corporation of Virginia Application June 17, 1936, Serial No. 85,666

4 Claims. (Cl. 23—152)

This invention relates to improvements in the production of chlorine dioxide. More particularly, the invention provides an improved operation embodying a special calcium cycle for the production of chlorine dioxide from chlorine, lime and hydrochloric acid.

The operation of the invention consists essentially of a special combination of three steps, first, the formation of calcium chlorate by further chlorination of partially chlorinated lime, second, the liberation of a gas mixture including chlorine and chlorine dioxide by reacting the thus formed calcium chlorate with hydrochloric acid, and third, the separation of chlorine from this gas mixture by selective absorption by lime, the partially chlorinated lime formed in the third step being supplied to the first step to complete the calcium cycle. In the combined operation of the invention, the clorination to form calcium chlorate, the first step, is effected in the presence of sufficient water to dissolve the calcium chlorate and at least part of the calcium chloride formed to form a calcium chlorate liquor to be supplied to the acid reaction, the second step. The acid reaction, the second step, is carried out without requiring removal of such calcium chloride.

Hydrochloric acid is, with advantage, supplied to the second step as such. It may, however, subject to disadvantages involved in the relative insolubility of calcium sulphate, be generated in the second step by reaction between the calcium chloride present and sulphuric acid supplied to the second step. The combined operation of the invention includes, in connection with the use of sulphuric acid in the second step, a subordinate sulphuric acid cycle. When using sulphuric acid in the operation of the invention, the calcium of calcium chlorate and calcium chloride entering the conversion reaction becomes calcium sulphate. In one embodiment of the invention, such calcium sulphate is separated from the reaction liquor making possible the return of the reaction liquor to the sulphuric acid reaction, after calcium sulphate separation and appropriate concentration.

The precise manner in which the several steps making up the combined operation of the invention are carried out is not essential to the present invention. For example, except for the supplying of partially chlorinated lime to the first step, this step may be carried out in accordance with conventional practice for the production of calcium chlorate, by effecting the chlorination at an elevated temperature, approximating 45°–75° C. for example. The acid reaction, the second step, is with advantage, however, carried out as described in my applications filed June 17, 1936, Serial Numbers 85,667 and 85,668. The acid reaction may be carried out as a continuous operation or as a succession of batch operations. In batch operation, the acid concentration is with advantage limited at the beginning of the operation and increased as the reaction proceeds to promote complete decomposition of the calcium chlorate. If sulphuric acid is used in either type of operation, the acid should be supplied to the reaction at a rate low enough to avoid caking of the calcium sulphate formed and the total proportion of acid supplied to the reaction may with advantage approximate 4 or 5 times that required to completely decompose the calcium chlorate. The separation of chlorine from the gas mixture including chlorine and chlorine dioxide formed in the second step may with advantage be effected as described in an application filed August 15, 1934, by James F. White, Serial Number 739,938, or as described in an application filed by me August 15, 1934, Serial Number 739,941, using calcium hydroxide as the separating reagent. For example, the gas mixture including chlorine and chlorine dioxide is passed in contact with a quantity of dry or substantially dry calcium hydroxide substantially exceeding that required to react with all of the chlorine present. A proportion of lime such that it is not more than 35% chlorinated is advantageous. In the combined operation of this invention, the lime, and with advantage all of the lime, supplied to the first step is used as the separating reagent in the third step, providing an appropriate excess promoting the effective separation of chlorine from the gas mixture and at the same time being partially chlorinated thus improving the overall efficiency of the combined operation. This separation may be carried out at temperatures approximating atmospheric temperatures and, in general, any provision for supplying heat to or carrying off heat formed in the reaction is unnecessary.

The accompanying flow diagrams, Figs. 1 and 2 of the drawings, will further illustrate the invention.

That portion of the flow diagram Fig. 1 in solid lines represents, for example, an operation such as that of the first of the following examples. In the chlorinator 1 partially chlorinated lime from the separator 3 is chlorinated to form calcium chlorate. In the generator 2 the calcium chlorate—calcium chloride liquor initially formed in the chlorinator 1 is reacted with hydrochloric acid to liberate a gas mixture including chlorine and chlorine dioxide. The chlorine content of this gas mixture is separated in the separator 3 in the partial chlorination of the lime supplied from the separator 3 to the chlorinator 1a. Residual liquor from the generator 2 is decomposed, with steam, in the still 16 from which liberated chlorine is returned to the chlorinator 1. A concentrated calcium chloride liquor is discharged from the still 16. The chlorine dioxide component of the gas mixture from the separator 3 is absorbed in an aqueous slurry of caustic soda, lime and petroleum coke in the absorber 9 to form an aqueous solution of sodium chlorite which is separated from the suspended solids in filter 10 and thereafter dried in the drier 11 to produce a solid sodium chlorite product.

That portion of the flow diagram Fig. 2 in solid lines represents, for example, an operation such as that of the second of the following examples. In the chlorinator 1a partially chlorinated lime from the separator 3a is chlorinated to form calcium chlorate. In the generator 2a the calcium chlorate—calcium chloride liquor initially formed in the chlorinator 1a is reacted with sulphuric acid to liberate a gas mixture including chlorine and chlorine dioxide. The chlorine content of this gas mixture is separated in the separator 3a in the partial chlorination of the lime supplied from the separator 3a to the chlorinator 1a. After concentration in the evaporator 4a, calcium chloride is precipitated in the crystallizer 5a from the calcium chlorate—calcium chloride liquor from the chlorinator 1a. This precipitated calcium chloride is separated from the calcium chlorate—calcium chloride liquor in the centrifuge 6a. Precipitated calcium sulphate is separated in the centrifuge 7a from the reaction liquor from the generator 2a. After this separation of calcium sulphate, the reaction liquor is concentrated in evaporator 8a and, together with fresh sulphuric acid, returned to the generator 2a. The chlorine dioxide component of the gas mixture from the separator 3a is absorbed in an aqueous slurry of caustic soda, lime and petroleum coke, to produce a solid sodium chlorite product as described in connection with Fig. 1.

The reaction liquor from the generator 2a after being separated from the precipitated calcium sulphate in the centrifuge 7a may be supplied, as described above, directly to the evaporator 8a, or, as in an operation such as that of the third of the foregoing examples, may be delivered to still 12a. The liquor is there subjected to treatment with steam whereby the remaining calcium chlorate in the liquor is decomposed, producing chlorine which is supplied to the chlorinator 1a, and a calcium chloride solution containing a small amount of precipitated calcium sulphate. This solution is supplied directly to the evaporator 8a. The reaction liquor from the generator 2a may likewise be subjected to treatment with steam in the still 12a, thus yielding chlorine and a calcium chloride solution containing a considerable amount of precipitated calcium sulphate. The precipitated calcium sulphate is separated from the calcium chloride liquor in centrifuge 13a and the clear liquor then supplied to the evaporator 8a. The reaction liquor from the generator 2a may also be supplied to the still 12a and the total content of calcium sulphate separated in centrifuge 13a.

The invention will be further illustrated by the following example of a particularly advantageous operation embodying the invention, appropriate apparatus for carrying this operation being illustrated, diagrammatically and conventionally, in Figure 3 of the accompanying drawings: Lime is supplied to the separator 3', a rotating cylinder provided internally with lifts to shower the lime through the gas stream flowing through the separator, at a rate of 117.5 pounds per hour 95% $Ca(OH)_2$, and in the separator is about 25% chlorinated. A slurry formed by the addition of water at a rate of 35 gallons per hour to this partially chlorinated lime in tank 4 is chlorinated, in the tile packed towers 1' and 5, at a temperature approximating 50°–80° C., with chlorine supplied through connection 6 at a rate of 84 pounds per hour. Of this chlorine, about 62 parts are supplied as make-up chlorine through connection 7 and about 22 parts are supplied as recovered chlorine through connection 8. The resulting calcium chlorate—calcium chloride liquor, containing about 125 grams per liter $(Ca(ClO_3)_2$ and 355 grams per liter $CaCl_2$, is cooled to 20°–30° C. in the tank 9 from which it is supplied, at this temperature, to the upper end of the generator 2' at a rate of 47.5 gallons per hour. This generator 2' is a stoneware bubble plate tower. Hydrochloric acid, 32% HCl, is supplied to the upper end of the generator 2', from tank 10', at a rate of 18 gallons per hour, this total quantity being divided between the upper two or upper three chambers in the generator. Air is forced into the lower end of the generator by means of blower 11' at a rate of 40 cu. ft. per minute. With a generator consisting of 9 chambers each retaining 19 gallons, the reaction time in the generator approximates 3.8 hours. With a reaction temperature of 20°–30° C., about 78.4% of the calcium chlorate is decomposed. Chlorine dioxide is produced at a rate of about 21.7 pounds per hour and chlorine at a rate of about 22.8 pounds per hour, this mixture of chlorine dioxide and chlorine, diluted with air, passing from the generator 2' to the separator 3' through duct 12. In the separator 3' the chlorine content of this gas mixture is selectively absorbed in partially chlorinating the lime, thus producing the partially chlorinated lime supplied to the chlorination effected in the tower 1', and in the tower 5, and a mixture of chlorine dioxide in air containing about 5% by volume of $ClO_2$, this chlorine dioxide mixture being discharged through duct 13. The chlorine dioxide component of the gas mixture discharged through duct 13 may be used to produce sodium chlorite.

The residual liquor from the reaction between the chloride—chlorate liquor and the hydrochloric acid, discharged from the generator 2' through connection 14, is introduced into the upper end of the recovery tower 15, a tile packed tower. Steam is blown into the pot 16' connected to the lower end of the tower 17 at a rate sufficient to heat the liquor entering the pot to boiling. The evolved vapor mixture, steam, chlorine and chlorine dioxide, passes up through the tower 15 in countercurrent to the cooler residual liquor from the generator. The thus recovered chlorine, and chlorine dioxide, pass to the chlorinator through connections 8 and 6 with added make-up chlorine introduced through connection 7. Residual calcium chloride liquor is discharged from the pot 16' through connection 17.

The invention will be further illustrated by the following example of one operation embodying the invention including appropriate additional steps for the ultimate production of sodium chlorite from the chlorine dioxide produced: About 42.1 parts (by weight) of a partially chlorinated lime, formed by chlorination of 35.7 parts of 96% Ca(OH)$_2$ are further chlorinated with 26 parts of chlorine in the presence of 114 parts of water at a temperature of about 60° C. About 91.25 parts of water are evaporated, from the resulting liquor, the concentrated liquor is cooled to about 30° C., and about 43.5 parts of precipitated calcium chloride tetrahydrate are separated from the cooled concentrated liquor. The resulting calcium chlorate—calcium chloride liquor, diluted with about 42.55 parts of water, is reacted with about 114 parts of 19 normal sulphuric acid. The sulphuric acid may be supplied to the reaction mixture, for example, at a rate of about 1 part per minute. Or, in batch operation, to improve the uniformity of the rate of liberation of chlorine dioxide, in amounts corresponding to 3.14 parts per minute for the first 5 minutes, none for the 6th to 8th minutes, in amounts corresponding to 1.14 parts per minute for the 9th to 43rd minutes, 2.07 parts per minute from the 44th to 49th minutes, 1.38 parts per minute for the 50th to 58th minute, 3.14 parts per minute for the 59th to 67th minutes and the balance during the 68th minute. The reaction mixture is vigorously agitated throughout the reaction and air is passed through the reaction vessel, at an initial rate of about 3.98 cubic feet per minute per pound of calcium chlorate supplied to the reaction and at a gradually reduced rate as the reaction proceeds. The liberated chlorine and chlorine dioxide, diluted with air, are contacted with about 35.7 parts of 96% Ca(OH)$_2$. The chlorine present is absorbed from the chlorine dioxide gas mixture by the lime. The thus partially chlorinated lime is supplied to the first-mentioned chlorination. Precipitated calcium sulphate, about 38 parts, is separated from the reaction liquor and washed with about 163 parts of water. The reaction liquor, from which calcium sulphate has been separated, combined with the wash liquor, approximately 6.5 normal with respect to sulphuric acid, is concentrated to a normality of about 15 by evaporation of 184.5 parts of water. About 27.4 parts of fresh sulphuric acid, 95% H$_2$SO$_4$, is added to this thus concentrated acid, about 86.6 parts, and this acid mixture is supplied to the sulphuric acid reaction. The chlorine dioxide gas mixture, from which chlorine has been separated, including about 8.7 parts of chlorine dioxide, is scrubbed with an aqueous slurry 0.1 molar with respect to sodium hydroxide and containing 5 parts of calcium hydroxide and 5 parts of finely pulverized petroleum coke per 100 parts of water. The concentration of sodium hydroxide, calcium hydroxide and coke is maintained by regular additions as the scrubbing is continued. The scrubbing medium is used until it is about 1.5 molar with respect to sodium chlorite. Suspended solids are then separated from the scrubbing medium, and the resulting sodium chlorite liquor is spray-dried or concentrated and then spray-dried to produce about 10 parts of sodium chlorite containing about 0.7 part of sodium chloride. The separated solids are resuspended in water, with appropriate additions, and re-used as a scrubbing medium until the calcium carbonate concentration of the thus formed scrubbing medium approximates 50 parts per 100 parts of water when the separated solids are discarded.

The invention will be further illustrated by the following example of another operation embodying the invention, this operation involving the use of a calcium chloride—calcium chlorate liquor having a chloride—chlorate ratio of 5:1 and a smaller quantity of excess sulphuric acid than that used in the preceding example: Partially chlorinated lime, formed by chlorination of 47.8 parts of 96% Ca(OH)$_2$ and containing 8.55 parts of chlorine, is further chlorinated by the addition of 124.05 parts of water and 35.4 parts of chlorine. After chlorination this liquor contains about 20.42 parts of calcium chlorate, 58.9 parts of calcium chloride and 135.2 parts of water. The resulting calcium chlorate—calcium chloride liquor is reacted with about 44.7 parts of 59% sulphuric acid added at the rate of .745 part per minute in batch operation. As a result of this reaction, 9.55 parts of chlorine dioxide and 8.55 parts of chlorine are evolved and are contacted with about 47.8 parts of 96% Ca(OH)$_2$. The chlorine is absorbed by the lime and, as described in the preceding example, the thus partially chlorinated lime is supplied to the first-mentioned chlorination and practically all of the 9.55 parts of chlorine dioxide are subsequently reduced and absorbed in the aqueous caustic soda-lime-coke slurry. The liquid and solid, discharged from the reaction between the chloride—chlorate liquor and the sulphuric acid, are separated and the clear liquor is then subjected to the action of steam. In this manner, the calcium chlorate remaining in the discharged liquid is decomposed yielding 5.49 parts of chlorine which are supplied to the first-mentioned chlorination. The 33.3 parts of calcium chloride resulting from this decomposition of the liquor with steam may be recovered in any suitable manner.

Chlorine dioxide produced in accordance with the invention may, of course, be used for the production of calcium chlorite or for any appropriate purpose such as the production of sodium chlorite, the ultimate product to which the last two of the foregoing examples and the accompanying flow diagrams more particularly refer. For example, chlorites of the alkali metals and the alkaline earth metals may be produced from chlorine dioxide gas mixtures produced in accordance with this invention by absorption in an aqueous solution or suspension of the corresponding hydroxide in the presence of an appropriate reducing agent. Petroleum coke and sulphur dioxide, for example, may be used as reducing agents in this connection. In the production of sodium chlorite, the chlorine dioxide, or the chlorine dioxide—air mixture, is with advantage scrubbed with an aqueous solution of caustic soda from 0.01 to 3.0 normal with respect to NaOH and containing between about 0.5 and 100 grams per liter of calcium hydroxide and from about 0.5 to 250 grams per liter of finely pulverized petroleum coke at a temperature in the range 0°–100° C. To avoid discoloration of the sodium chlorite product, the concentration of the solution with respect to caustic soda is with advantage limited not to exceed about 1 molar, or better 0.5 molar. The concentration efficiency is improved by using the scrubbing medium only until the concentration of the scrubbing medium with respect to sodium chlorite approximates 3 molar, or better 1 molar. The solids separated from this sodium chlorite liquor may be re-used, with appropriate additions of water, carbon, lime and sodium hydroxide, as the scrubbing medium until the calcium carbonate content of the thus formed scrubbing medium approximates 750 grams, or better 150 grams, per liter. When this concentration is reached, the separated solids should be discarded. After separation of the carbon present, these solids, calcium carbonate containing some lime, may be supplied to the chlorination to form calcium chlorate as part of the lime to be supplied to this reaction. When this calcium carbonate—lime mixture is so used, however, it should be supplied directly to the chlorination rather than to the chlorine separation, the third step of the combined operation of the invention.

I claim:

1. In the production of chlorine dioxide, the improvement which comprises separating chlorine from a gas mixture including chlorine and chlorine dioxide by selective absorption of the chlorine by lime, subjecting the thus partially chlorinated lime to further chlorination to form calcium chlorate, reacting the thus formed calcium chlorate with hydrochloric acid to liberate a gas mixture including chlorine and chlorine dioxide, supplying this gas mixture to the first-mentioned separation and taking off chlorine dioxide from the first-mentioned separation.

2. In the production of chlorine dioxide, the improvement which comprises separating chlorine from a gas mixture including chlorine and chlorine dioxide by selective absorption of the chlorine by lime, subjecting the thus partially chlorinated lime to further chlorination to form calcium chlorate in the presence of sufficient water to dissolve the calcium chlorate formed, reacting the thus formed calcium chlorate liquor with hydrochloric acid to liberate a gas mixture including chlorine and chlorine dioxide, supplying this gas mixture to the first-mentioned separation and taking off chlorine dioxide from the first-mentioned separation.

3. In the production of chlorine dioxide, the improvement which comprises separating chlorine from a gas mixture including chlorine and chlorine dioxide by selective absorption of the chlorine by lime, subjecting the thus partially chlorinated lime to further chlorination to form calcium chlorate in the presence of sufficient water to dissolve the calcium chlorate and at least part of the calcium chloride formed, reacting the thus formed calcium chlorate—calcium chloride liquor with an acid to liberate a gas mixture including chlorine and chlorine dioxide, supplying this gas mixture to the first-mentioned separation and taking off chlorine dioxide from the first-mentioned separation.

4. In the production of chlorine dioxide, the improvement which comprises separating chlorine from a gas mixture including chlorine and chlorine dioxide by selective absorption of the chlorine by lime, subjecting the thus partially chlorinated lime to further chlorination to form calcium chlorate in the presence of sufficient water to dissolve the calcium chlorate and at least part of the calcium chloride formed, reacting the thus formed calcium chlorate liquor with sulphuric acid to liberate a gas mixture including chlorine and chlorine dioxide, supplying this gas mixture to the first-mentioned separation, separating calcium sulphate from the liquor resulting from the sulphuric acid reaction and concentrating and returning the reaction liquor remaining after this calcium sulphate separation to the sulphuric acid, and taking off chlorine dioxide from the first-mentioned separation.

GEORGE PAUL VINCENT.